United States Patent [19]
Harrison et al.

[11] 3,727,400
[45] Apr. 17, 1973

[54] GAS TURBINE AIR COMPRESSOR AND CONTROL THEREFOR

[75] Inventors: Emmett S. Harrison, Corona, N.Y.; August H. Zoll, Cedar Grove, N.J.

[73] Assignee: Curtiss-Wright Corporation, Wood-Ridge, N.J.

[22] Filed: June 10, 1971

[21] Appl. No.: 151,794

Related U.S. Application Data

[62] Division of Ser. No. 41,509, May 28, 1970.

[52] U.S. Cl. ................... 60/39.29, 415/17, 415/28, 417/408
[51] Int. Cl. .............................................. F02c 9/14
[58] Field of Search ........................ 60/39.29, 39.07, 60/39.23; 137/554, 497, 501; 417/302, 408, 409; 415/13, 17, 28

[56] References Cited

UNITED STATES PATENTS

| | | |
|---|---|---|
| 3,060,686 | 10/1962 | LeMay et al. ..................... 60/39.07 |
| 2,393,482 | 1/1946 | Smith ................................ 137/554 |
| 3,080,712 | 3/1963 | Wood ................................ 60/39.29 |
| 3,080,713 | 3/1963 | Silver ................................ 60/39.29 |
| 2,958,457 | 11/1960 | Fox .................................... 60/39.29 X |
| 3,172,259 | 3/1965 | North ................................ 60/39.29 X |
| 3,219,309 | 11/1965 | Alberani ............................ 60/39.29 |
| 3,245,219 | 4/1966 | Warden ............................ 60/39.29 X |
| 3,418,806 | 12/1968 | Wagner ............................ 60/39.29 X |

Primary Examiner—Al Lawrence Smith
Assistant Examiner—Robert E. Garrett
Attorney—Arthur Frederick and Victor D. Behn

[57] ABSTRACT

A gas turbine air compressor which has an air by-pass connected to a place of use or storage is provided with an overload prevention system to avoid excessive by-pass of compressed air and the consequent overheating and failure of the combustor and turbine components of the gas turbine compressor.

2 Claims, 3 Drawing Figures

INVENTORS.
EMMETT S. HARRISON
AUGUST H. ZOLL
BY
ATTORNEY

GAS TURBINE AIR COMPRESSOR AND CONTROL THEREFOR

The present application is a divisional application of applicants' pending U.S. patent application, Ser. No. 41,509, filed May 28, 1970 for a gas turbine air compressor and control therefor.

This invention relates to turbojet engines for use industrially as distinguished from use as a vehicle or aircraft propulsion means and, more particularly, to turbojet engines to generate compressed air and an overload prevention system to avoid excessive by-pass of compressed air and the consequent overheating and failure of the combustor and other turbine components of the turbojet engine.

BACKGROUND OF THE INVENTION

In the application of turbojet engines for industrial uses, such as a source of compressed air for systems for the production of artificial snow, it is desirable to provide a safety control means for preventing the excessive by-pass of compressed air and damage to the combustor or other components of the turbojet engine resulting from the overheating of the engine.

It is, therefore, an object of this invention to provide a novel turbojet engine for generating compressed air which engine cannot be overloaded and thus overheated and damaged by excessive demand for compressed air.

It is another object of the present invention to provide, in a turbojet engine for generating compressed air, a warning to an operator when excessive demand for compressed air occurs.

SUMMARY OF THE INVENTION

Accordingly, the present invention contemplates a novel turbojet engine (hereinafter referred to as a gas turbine air compressor) wherein a portion of the compressed air discharged from the compressor section is bled or by-passed, from its flow into the combustion section, to an outlet manifold. From the outlet manifold, the compressed air is passed, via an outlet pipe, to a system requiring compressed air or to a storage means. Since the bled or by-passed air is at a pressure determined by the compressor ratio which corresponds to the amount of air bled or by-passed in relation to the total air flow passing through the compressor, quantities of by-passed compressed air in excess of a specified or predetermined maximum caused by excessive demand for compressed air at the point of use or storage will result in insufficient air flow through the combustion and turbine sections of the gas turbine air compressor and overheating and failure of the components of those sections. To prevent this overheating and damage, the gas turbine air compressor is provided with a safety control system according to this invention.

The safety control system according to this invention comprises a flow control valve disposed in the air outlet pipe, which valve is connected to a means for actuating the valve to positions between fully open to fully closed. The valve is normally set in the fully open position so that under normal demand loads, where the compressor pressure ratio is high, compressed air will flow to the place of use. If the compressor ratio decreases below a preselected value upon an excessive demand load imposed on the gas turbine compressor, the valve will close an amount proportionate to the drop in pressure ratio to restore and maintain the preselected compressor pressure ratio. A pressure sensing and transmitting means is connected to the inlet and outlet portions of the compressor section to sense compressor inlet and outlet pressures. The pressure signals are transmitted to a controller which computes the ratio of the pressures and compares the same relative to the preselected compressor pressure ratio value and, if the measured pressure ratio is below that of the preselected value, transmits an appropriate signal to the valve actuating means which effects movement of the valve toward a closed position so as to restore the pressure ratio to the preselected value.

In one embodiment of this invention, the control system utilizes pressurized fluid, such as air, while another embodiment employs electrical components.

In both embodiments, the control system includes a signal means, visual and/or audible which warns an operator that the compressed air demand rate exceeds the maximum predetermined amount the gas turbine air compressor can provide without overheating and damage. This signal means may comprise a switch which is actuated to close an electrical circuit to a warning means, such as a bell and/or a light, when the valve is actuated from the fully open position.

BRIEF DESCRIPTION OF THE DRAWINGS

The invention will be more fully understood from the following detailed description thereof when considered in connection with the accompanying drawing wherein two embodiments of the invention are illustrated by way of examples, and in which.

DESCRIPTION OF THE PREFERRED EMBODIMENTS

Figure 1:
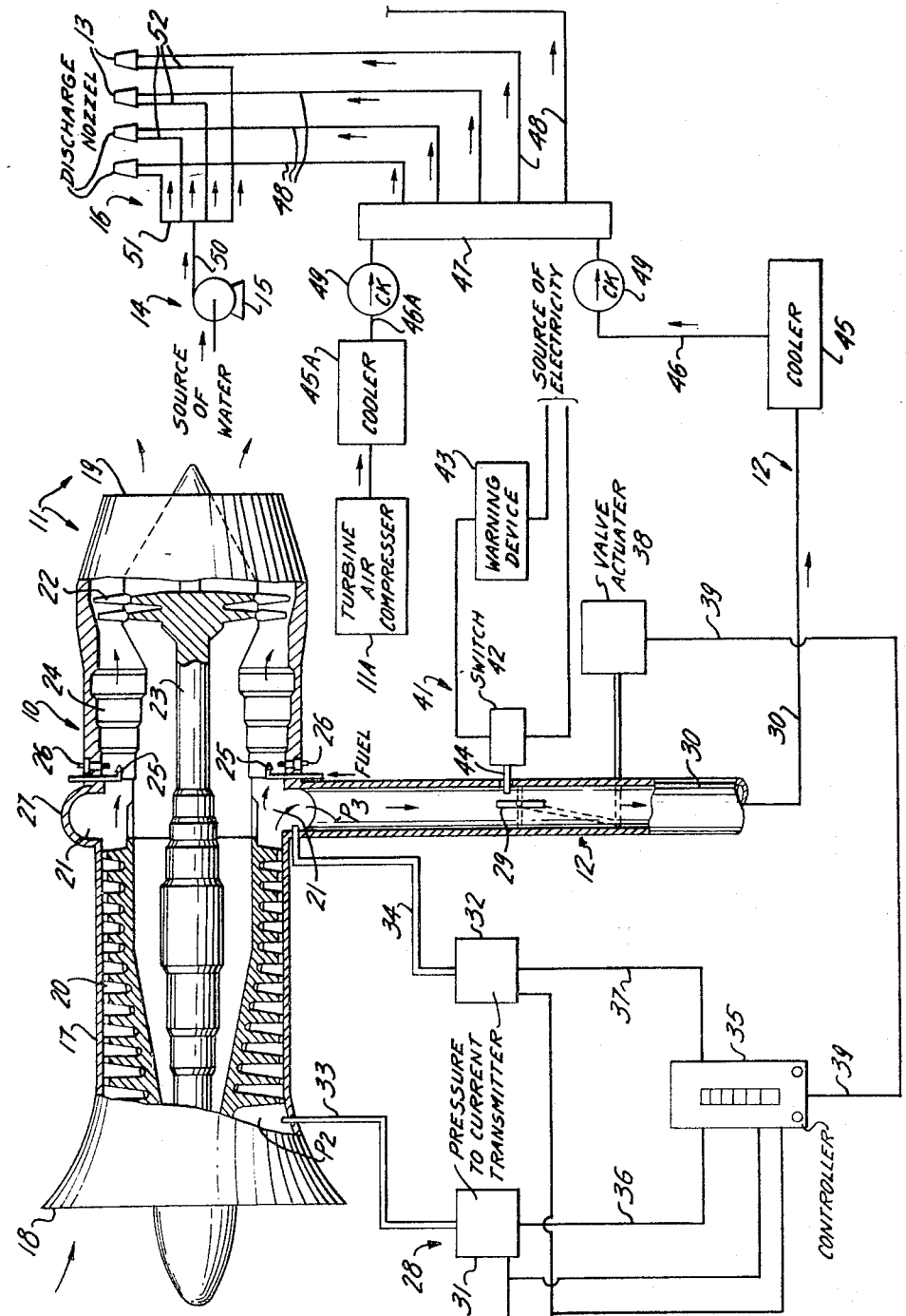
FIG. 1 is a schematic illustration of a safety control system according to this invention for a gas turbine air compressor.

Now referring to the drawings and, more specifically, FIG. 1, 10 generally designates a gas turbine air compressor which has a safety control system 28 according to this invention. The gas turbine air compressor 10 is, for illustration purposes, only shown and hereinafter described as forming a part of a snow-producing system 11. The gas turbine air compressor 10 is connected, through an outlet conduit means 12, to deliver compressed air to a discharge nozzle means 13 which may comprise a plurality of discharge nozzles of the type such as disclosed in the U.S. Pat. Nos. 3,298,612; 3,301,485; 3,408,005; and 3,494,559. In addition, system 11 has a water supply means 14, including pump 15, which is connected, via water conduit means 16, to deliver water to the discharge nozzle means 13, the latter providing for the atomization of the water with the compressed air and the discharge of the mixture into the atmosphere to thereby produce snow-like water particles.

Figure 3:
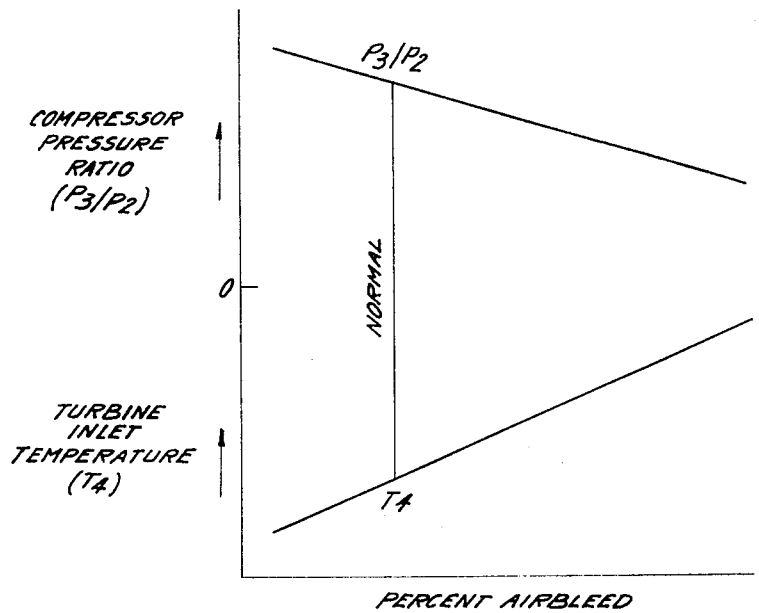
FIG. 3 is a graph showing the relationship between change in compressor pressure ratio and by-passed compressed air demand and turbine inlet temperature.

The gas turbine air compressor 10 broadly comprises an elongated, generally cylindrical housing 17 having an air inlet opening 18 at one end thereof and an exhaust outlet opening 19 at the opposite end. A compressor assembly 20, which may be of the multistage, axial flow type, is disposed in housing 17 adjacent inlet opening 18 to draw air therethrough and compress such air. An annular outlet chamber 21 is formed adjacent compressor assembly 20 to receive compressed air from the latter. A gas turbine assembly 22, which may be of the multi-stage, axial flow type, is disposed in housing 17 adjacent exhaust outlet opening 19 and is connected, through a shaft 23, to drive the compressor assembly 20. A combustor 24 is disposed between compressor assembly 20 and turbine assembly 21 to communicate with annular outlet chamber 21 and receive compressed air from the latter. The combustor has fuel injection means 25 and ignition means 26, such as sparks plugs, to provide for light-off and for burning of fuel and the generation of gaseous products of combustion. The combustor 24 is in communication with turbine assembly 22 so as to pass gaseous products of combustion to the turbine assembly and, thereby, effect rotation of turbine assembly 22. A bleed or by-pass manifold 27, toroidal in configuration, is provided adjacent outlet chamber 21 to provide for the bleeding or by-passing of compressed air discharging from compressor assembly 20 away from combustor 24 and turbine assembly 22. The gas turbine compressor is constructed and arranged to provide for by-passing substantial quantities of compressed air, as for example, between 13,000 CFM (cubic feet per minute) and 50 PSIG (pounds per square inch gage) and 26,650 CFM at 85 PSIG, depending upon size. The value of the by-passed compressed air outlet pressure, relative to the air pressure at the inlet of the compressor, hereinafter referred to as compressor pressure ratio, corresponds to the amount of air bled or by-passed in relation to the total air flow from compressor assembly 20 into inlet chamber 21. Thus, when quantities of compressed air in excess of a predetermined maximum, as measured by a decrease in compressor pressure ratio below a selected compressor pressure ratio, insufficient volume of air will flow through combustor 24 and turbine assembly 22 and result in overheating and damage to the components of those assemblies. The relationship of compressor pressure ratio, turbine inlet temperatures and the amount of airbleed or by-passed compressed air, is illustrated by the graph shown in FIG. 3. As clearly shown in the graph, the compressor pressure ratio varies inversely as the amount of airbleed varies, while turbine inlet temperature varies directly as the amount of airbleed varies. Thus, it is evident that compressor pressure ratio is a measure of the amount of airbleed and that a compressor pressure ratio may be selected to represent the maximum amount of airbleed acceptable without danger of damage to the combustor or turbine due to overheating. As shown in FIG. 3, the predetermined or reference compressor pressure ratio may be established at the intersection of the line labelled "normal" and the line, $P_3/P_2$, representing the compressor pressure ratio curve. To prevent this overheating and damage to the gas turbine air compressor due to excessive compressed air demand or load thereon, gas turbine air compressor 11 is provided with a safety control system 28, according to this invention.

The safety control system 28, as shown in FIG. 1, comprises electronic components and a control valve 29 disposed in an outlet pipe 30 which forms part of conduit means 12. The pipe 30 is connected at one end to manifold 27 to conduct compressed air from the latter. The control valve 29 is normally in a fully open position which it retains until the amount of compressed air demand exceeds the predetermined maximum amount. The electronic components include suitable pressure-to-current transmitters 31 and 32 which may be of the type manufactured by Fischer and Porter Company of Warminster, Pa., U.S.A. and designated type Series 50 EP 1000. The transmitter 31 is in communication with inlet opening 18 of gas turbine air compressor 10, via a line or pipe 33, to conduct or, in effect, sense inlet air pressure, $P_2$, while transmitter 32 is in communication with manifold 27, via a line or pipe 34, to conduct or, in effect, sense the pressure, $P_3$, of compressed air being by-passed into outlet pipe 30. Each of the transmitters 31 and 32 functions to measure the fluid pressure conducted thereto and convert the same into a voltage signal which is transmitted to a controller 35. The voltage signals, from transmitters 31 and 32, are transmitted to controller 35 by way of electrical conduits 36 and 37, respectively. The controller 35 may be of any suitable type, such as the electronic controller of the kind manufactured by Fischer and Porter Company, Warminster, Pa., U.S.A. and designated Series 53 EL 3000 and identified by the trademark "Scan-line." The controller 35 is capable of adjustment to produce specified voltage equivalent to a predetermined pressure ratio to establish a reference value. The controller 35 is also constructed and arranged to compute electronically the compressor pressure ratio, as indicated by the voltage signals conducted to the controller, via lines 36 and 37, and electronically compare this compressor pressure ratio with the predetermined or reference pressure ratio. If the measured compressor pressure ratio is at or higher than the predetermined or reference pressure ratio, no output signal is generated by the controller and valve 29 remains in the fully open position. If the measured pressure ratio falls below the predetermined or reference pressure ratio, the controller emits an electric output signal proportional to the difference in pressure ratios which is conducted to a valve actuator 38 by an electrical conduit 39. The valve actuator may be of conventional construction and may have a servo-motor connected to one end of a linkage assembly 40 which interconnects the servo-motor with the valve 29 to effect actuation of the latter.

In operation of safety control system 28, transmitters 31 and 32 constantly monitor the compressor air inlet pressure, $P_2$, and compressed air pressure, $P_3$, in manifold 27 through pressure lines 33 and 34, respectively. Each of the transmitters 31 and 32 generate electrical voltage signals proportionate to the sensed pressures, $P_2$ and $P_3$, which are conducted, via electric conduits 36 and 37, to controller 35. The controller 35 electrically divides the input voltage signals to produce a voltage signal representative of the ratio between $P_2$ and $P_3$. This ratio voltage is compared with the predetermined or reference ratio voltage by controller 35. If the measured ratio voltage is lower than the reference voltage, controller 35 transmits, via electrical conduit 39, an output signal which effects operation of valve actuator 38 and, through linkage assembly 40, movement of valve 29 toward a closed position. The valve 29 modulates until the ratio between $P_2$ and $P_3$ is restored to or reaches a value above the predetermined or reference pressure ratio. When at least minimum pressure ratio is restored, valve actuator 38 effects movement of valve 29 back to the fully open position. If the excessive demand condition continues to exist, controller 35, upon determining that the pressure ratio between $P_2$ and $P_3$ is again below the reference pressure ratio, will cause valve actuator 38 to again move valve 27 towards the closed position and establish the minimum allowable pressure ratio. Since the reference pressure ratio is selected to be equivalent to a safe maximum compressed air demand or load which gas turbine air compressor 10 can deliver without overheating and damage to the combustor and turbine components, the gas turbine air compressor is automatically protected from this inadvertent damage and still provides maximum permissible airflow at all times.

To alert an operator of the snowmaking system 11 to the existence of an overload or excessive compressed air demand on gas turbine air compressor 10, an alarm circuit 41 may be provided. As shown, the alarm circuit 41 may comprise a micro-switch 42, mounted on outlet pipe 30 adjacent valve 29, which switch is electrically connected to a source of electrical current and a warning means 43, such as an alarm bell and/or warning light. The micro-switch 42 has an actuating plunger 44 which is positioned relative to valve 29 so that upon movement of valve 29, from the normally open position, toward a closed position, as shown by the dot-dash line, the plunger 44 is moved to close the switch and thereby complete the electrical circuit to the warning means 43, and, in turn, visually and/or audibly alert an operator to this undesirable overload condition, while the valve modulates to hold the minimum pressure ratio.

The snowmaking system 11, in addition to the above described gas turbine air compressor 10, comprises a cooler 45 connected to pipe 30 to receive compressed air. The cooler 45 may be of any suitable construction, well known to those skilled in the heat exchange art, which is capable of passing the relatively hot compressed air into indirect heat exchanger relationship with a cooling fluid, such as atmospheric air. From cooler 45, the cooled compressed air is conducted by pipe 46 to accumulator-manifold 47. From accumulator-manifold 47, the compressed air is delivered to the plurality of nozzles 13 by way of a plurality of branch pipes 48. If, as shown in FIG. 1, the system 11 comprises one or more additional gas turbine air compressors 10, such other gas turbine air compressor 10A are connected to a cooler 45A, similar to cooler 45 and accumulator-manifold 47, check valves 49 are disposed in pipes 46 and 46A respectively. The check valves 49 are of particular importance in an installation wherein one of the gas turbine air compressors is shut down for repair or inspection or is on stand-by status while the other is in operation, to prevent loss of compressed air and protect the idle gas turbine air compressor from damage.

As previously described, system 11 includes a water pump 15 which pumps water, from a source thereof, through conduit means 16, to discharge nozzles means 13. The conduit means 16 comprises a pump outlet pipe 50, a water manifold 51 which is connected to outlet pipe 50 to receive water therefrom and a plurality of branch conduits 52 for conducting the water to each of the plurality of discharge nozzles means 13.

Figure 2:
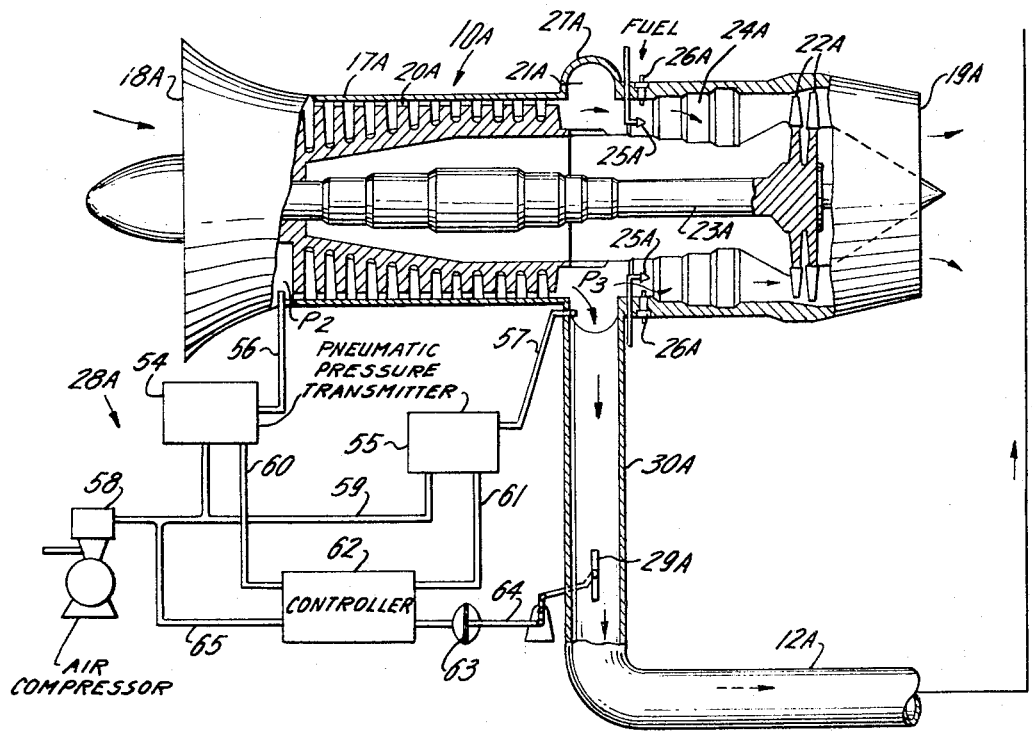
FIG. 2 is a schematic showing of another embodiment of the safety control system according to this invention.

In FIG. 2 is shown an alternative safety control system, designated 28A, for a gas turbine air compressor. Essentially, the safety control system 28A shown in FIG. 2 differs from safety control system 28 illustrated in FIG. 1 in that it is a pneumatic system as distinguished from the electronic system of FIG. 1. The safety control system 28 is usable in conjunction with a gas turbine air compressor 10A similar to gas turbine air compressor 10 shown in FIG. 1. Since gas turbine air compressor 10A shown in FIG. 2 is similar to gas turbine air compressor 10, parts of gas turbine air compressor 10A, corresponding to like parts of gas turbine air compressor 10, will be designated by the same number but having the suffix A added thereto.

As shown in FIG. 2, the pneumatic safety control system 28A comprises two pneumatic pressure transmitters 54 and 55 which are in communication, through pressure lines or pipes 56 and 57, respectively, with inlet opening 18A and outlet chamber 21A. The pipes 56 and 57 function to transmit air pressure, $P_2$ and $P_3$, at inlet opening 18A and outlet chamber 21A, respectively, to transmitters 54 and 55. A source of pneumatic pressure, such as air compressor 58, is connected, via pipe 59, to pressure transmitters 54 and 55. This separate source of pneumatic pressure provides the safety control system with a control pressure so that an output pressure is generated in the transmitters which is proportional to the input pressure $P_2$ and $P_3$. This output pneumatic pressure generated by pressure transmitters 54 and 55 is conducted by pipes 60 and 61, respectively, to a pneumatic controller 62. The pressure transmitters 54 and 55 may be of any suitable type, such as the pneumatic pressure transmitters of the type, KD 14, manufactured by Bailey Meter Company, Wickliffe, Ohio. The pneumatic controller 62 is constructed and arranged to divide the pressure signal corresponding to $P_2$ into the pressure signal corresponding to $P_3$, which resultant pressure ratio is compared with a reference or predetermined pressure representing the least pressure ratio at which gas turbine air compressor 10A can operate without overheating and damage to the components of combustor 24A and turbine 22A. If the controller senses a decrease in the measured pressure ratio as compared with the reference pressure ratio, the controller effects the actuation of control valve 29A toward a closed position through a conventional diaphragm type servo-mechanism 63 and linkage assembly 64. The control valve 29A modulates in the closed direction to bring the pressure ratio back to the predetermined value in the same manner as previously described with respect to the embodiment shown in FIG. 1. The controller 62 is connected to a control pressure via pipe 65. The controller is of any suitable construction and may be of the type manufactured by Bailey Meter Company of Wickliffe, Ohio and designated 500 Hand/Automatic Station with Adjustable Set Point and commercially sold under the trademark "Mini-line." The control system 28A herein above described may also include a warning means (not shown) of the type shown and described in connection with safety control system 28.

It is now believed readily apparent that the present invention provides a novel safety control system which protects the gas turbine air compressor against overheating and damage due to an excessive demand thereon for compressed air at the point of use or storage.

Although various embodiments of the invention have been illustrated and described in detail, it is to be expressly understood that the invention is not limited thereto. Various changes can be made in the arrangement of parts without departing from the spirit and scope of the invention, as the same will now be understood by those skilled in the art. For example, in place of pipes 33 and 34 of the safety control system 28 (see FIG. 1), piezocrystals may be employed to sense air pressure, $P_2$ and $P_3$ and transmit voltage signals to controller 62.

What is claimed is:

1. In combination with a turbojet engine having a combustor, a gas turbine and air compressor driven by gaseous products of combustion generated by compressed air and fuel burned in the combustor, a by-pass means communicating with the compressor to by-pass some of the compressed air flowing to the combustor, outlet conduit means communicating with said by-pass means for receiving from the latter by-pass compressed air and conducting the compressed air to a place of use or storage, and a safety control system comprising:
   a. a valve means disposed in an open position in said outlet conduit means;
   b. transmitter means for sensing compressor inlet and outlet air pressure and transmitting signals corresponding to such air pressures; and
   c. controller means connnected to said valve means and to the transmitter means to receive the signals from the transmitter means and, when the pressure ratio decreases below a predetermined minimum pressure ratio, respond thereto and cause the valve means to move toward the closed position and modulate compressed air flow through the outlet conduit means until the predetermined minimum pressure ratio is restored.

2. The combination of claim 1 wherein the control system includes an alarm circuit comprising:
   a. a warning device;
   b. a switch means connected to the warning device and the valve means so that when the latter closes it actuates the switch means to thereby activate the warning device.

* * * * *